April 8, 1924.
C. S. ASH
1,489,687
VEHICLE WHEEL
Filed Oct. 12, 1920    3 Sheets-Sheet 2
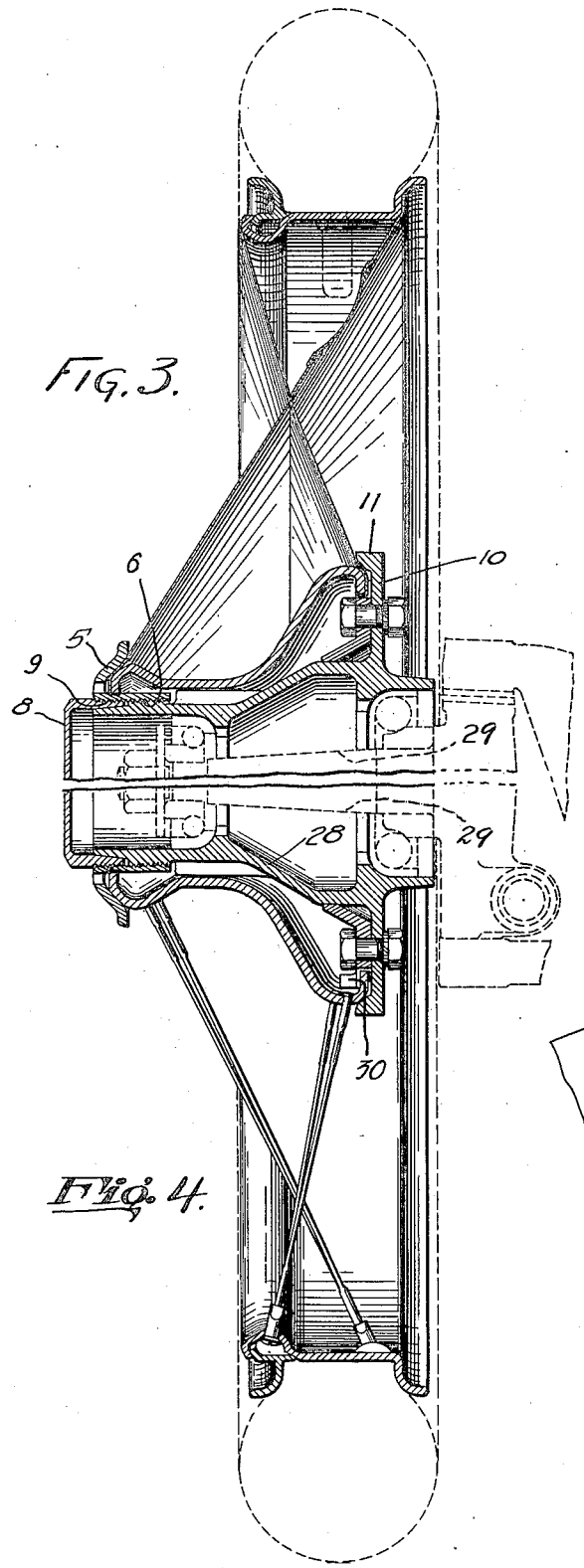
FIG. 3.
Fig. 4.
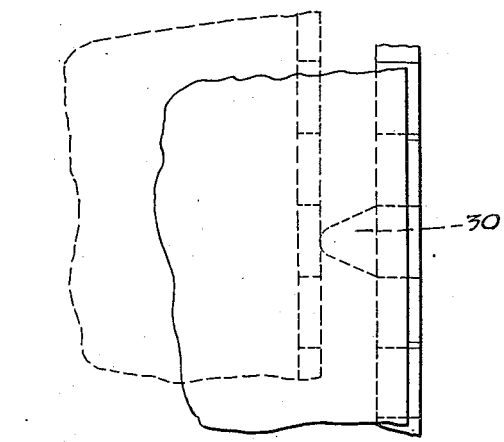
Fig. 5.
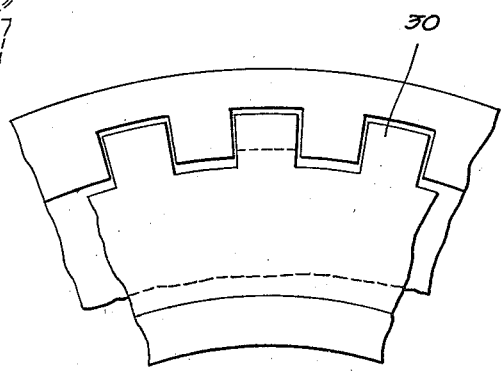
Fig. 6.
INVENTOR
C. S. Ash
BY
Duell, Warfield & Duell
ATTORNEYS

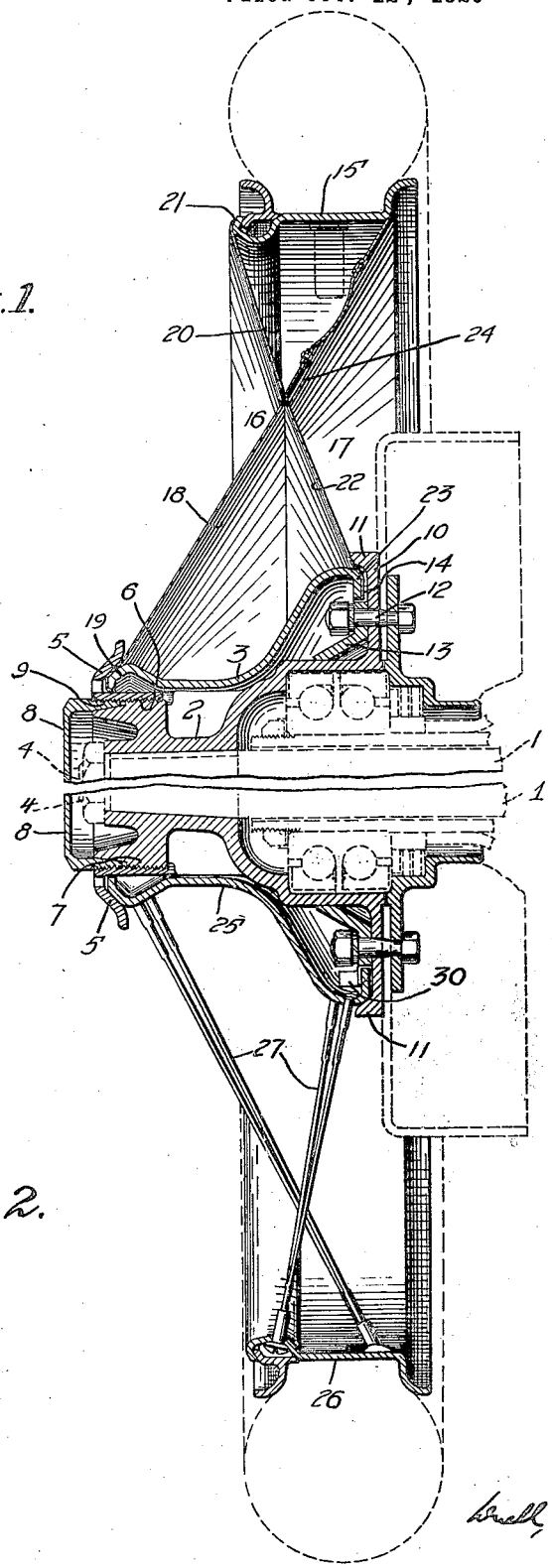

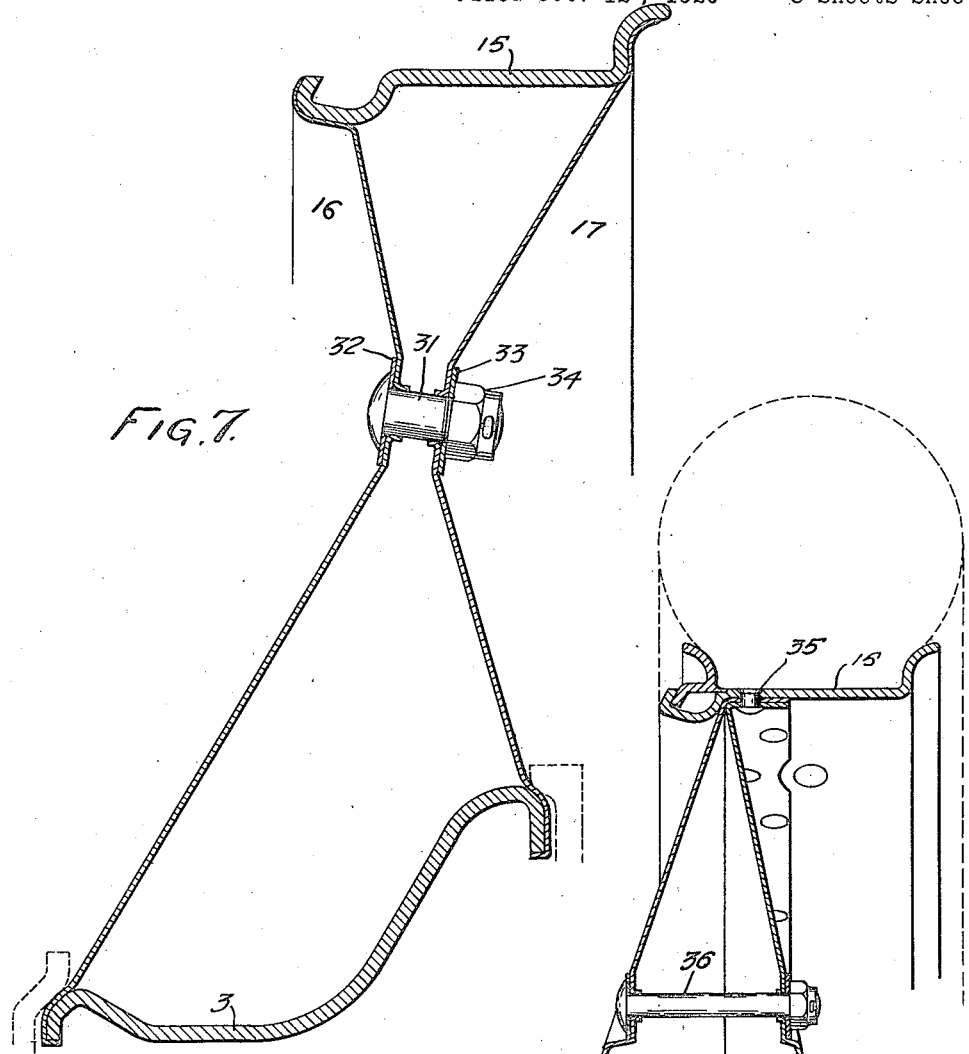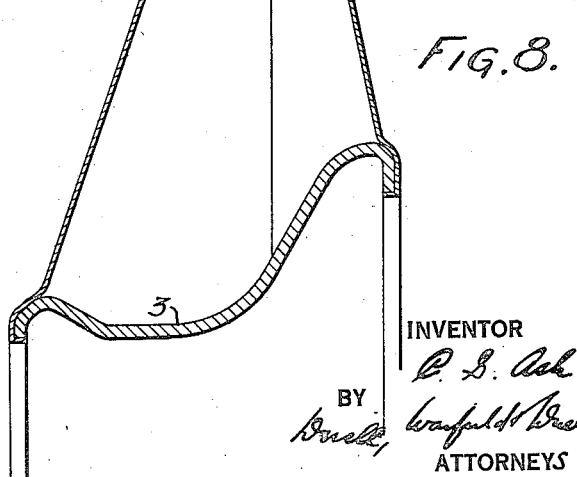

Patented Apr. 8, 1924.

1,489,687

UNITED STATES PATENT OFFICE.

CHARLES SAMUEL ASH, OF DETROIT, MICHIGAN.

VEHICLE WHEEL.

Application filed October 12, 1920. Serial No. 416,404.

*To all whom it may concern:*

Be it known that I, CHARLES S. ASH, a citizen of the United States, residing at Detroit, in the county of Wayne and State of Michigan, have invented certain new and useful Improvements in Vehicle Wheels, of which the following is a full, clear, and exact description, such as will enable others skilled in the art to which it appertains to make and use the same.

This invention relates to vehicle wheels and more particularly to quick detachable wheels for automobiles.

It is an object of the invention to provide an improved construction and assembly of vehicle wheels including a rim and an outer hub which are connected by tension members.

It is a further object of the invention to provide an improved construction of wheel-receiving parts and associated locking means adapted to receive, interchangeably, quick detachable wheels having their hub members connected to the rims by a plurality of wire spokes or by discs.

Another object is to provide strong durable and relatively light, detachable disc wheels wherein the outer hub and rim are connected by a plurality of discs placed under tension when applied to the inner hub, and wherein the discs constitute in effect reinforcements joining respectively the outer edge of the rim to the inner end of the hub and the inner edge of the rim to the outer end of the hub.

Additional features of structural superiority and functional advantage resident in the invention will in part be set forth hereinafter in connection with the following description of the accompanying drawings which illustrate preferred embodiments of the invention, and wherein—

Fig. 1 is a central vertical section of a wheel assembly showing a disc wheel mounted on a driving axle.

Fig. 2 is a view similar to Fig. 1 but showing a wire spoked wheel.

Figs. 3 and 4 show views similar respectively to Figs 1 and 2 wherein the parts are mounted on the steering spindle.

Fig. 5 shows a fragmentary plan view of certain parts,

Fig. 6 shows a fragmentary elevation of parts shown in Fig. 4,

Fig. 7 is a fragmentary radial section through a second embodiment of the invention relative to the disc wheel and Fig. 8 shows a corresponding view of another embodiment relative to a disc wheel.

Referring more particularly to the drawings, the assembly on the rear axle includes a driving shaft 1 with an inner hub 2 keyed thereon and telescopically receiving the outer hub 3 of the removable wheel unit. Hub 2 is secured in place by nut 4 and the outer hub 3 is in turn held against axial displacement by a locking ring 5 having an interiorly threaded portion 6 which screws on the outer enlarged end 7 of the inner hub and by a cap 8 having an exteriorly threaded edge 9 which screws in the threads of the ring 5 and wedges against a correspondingly tapered seat of the hub enlargement 7.

The inner end of the hub 2 has an integral radial flange 10 with a circumferential overhang 11 functioning as hereinafter described. Flange 10 may be secured to the adjacent brake drum by a plurality of bolts 12 which latter as shown also serve to clamp to the inner hub as a part thereof a ring 13 provided with angular serrations 14 adjacent to the flange 10 and adapted to interfit with complementary serrations of the wheel hub to effect a rotary interlock between the axle hub 2 and the wheel hub 3 as will appear.

As shown in Fig. 1 the quick detachable wheel unit is of the disc type and includes the outer hub 3, a tire carrying rim 15 and a pair of discs 16 and 17 respectively joining the outer edges of the rim and hub, and the inner edges thereof. More specifically, disc 16 is shaped to provide an inner conical portion 18 which laps over the outer end wall 19 of the hub 3 and is suitably joined thereto as by welding, and an outer reverse conical portion 20 lapped over the outer edge wall 21 of the rim and suitably joined thereto, also as by welding. The portion 18 of the outer disc is disposed substantially in the line connecting the outer end of the hub 3 and the inner edge of the rim 15, while the other portion 20 of the disc 16 is disposed substantially in the line connecting the outer edge of the rim 15 and the inner end of the hub 3. Likewise the inner disc 17 is shaped to provide an inner conical portion 22 which is lapped over and may be welded to the inner end wall 23 of the hub 3 and an outer reverse conical portion 24 which is lapped on and may be welded to the inner edge of the rim 15.

In the present embodiment, the discs 16 and 17 are connected as by welding along a circumferential line at the apexes of the angles made by the portions 18 and 20 on the one hand and 22 and 24 on the other, whereby the portion 20 of disc 16 and the portion 22 of disc 17 constitute in effect a straight tension member joining the outer edge of the rim 15 and the inner end of the hub 3 and the portion 18 of disc 16 and the portion 24 of disc 17, likewise constitute in effect a straight tension member between the inner edge of the rim 15 and the outer end of hub 3. In the process of manufacture, the discs may be welded or otherwise suitably joined to each other with the parts taut so that the wheel unit is strong and rigid.

Hub 2 adapted for telescopic application thereon of the hub 3 and parts associated therewith and in such application on account of the design and proportion of the parts herein described, the overhanging wall 11 of the inner hub flange 10 will bear against the disc portion 22 while the locking ring 5 likewise bears against the portion 18 of disc 16 so that in each instance the ends of the inner hub are enclosed and reinforced against radial distortion and the discs are placed under increased tension and the union between the discs and the hub 3 is gripped against loosening.

As shown in Fig. 2, the hub 2 is adapted to interchangeably receive the wire spoked wheel comprising an outer hub 25, and a tire carrying rim 26 connected by interlaced and crossed spokes 27. It will be noted that the locking ring 5 and the hub flange overhang 11 cooperate with the outer and inner ends respectively of the hub 25 in this case to reinforce the latter against radial distortion under the tension of the spokes 27 and the strain of service.

Figs. 3 and 4 illustrate similar views of interchangeable quick detachable disc and wire wheels as mounted on the inner hub 28 adapted for a non-rotating or steering spindle 29. The locking ring 5, the cap nut 8 and the hub flange 10 cooperate to hold and reinforce the wire wheel unit or the disc wheel unit in the manner as described in connection with Figs. 1 and 2.

In order to facilitate telescopic application of the detachable wheel units to the inner hub 2, or the inner hub 28, the driving ring 13 which is secured to the inner hub may be provided with one or more bent and pointed teeth extensions 30 to register with the recesses in the inturned wall at the inner end of the wheel hub for guiding the latter during the telescopic positioning thereof. It is to be noted also that the form of rotary lock thus effected between the axle hub and the wheel hub embodies a plurality of interfitting parts having abutting faces disposed radially to the axle, that is at right angles to the direction of torque transmission.

The modified embodiment of the disc wheel as shown in Fig. 7 includes the inner hub 3 and the rim 15 which are connected by the discs 16 and 17, the latter, however, in this case not meeting at the apex of the conical portions 18 and 20 and 22 and 24 but being connected by a plurality of circumferentially arranged bolts 31 extending through apertures in the disc and seating against rings or washers 32 and 33 whereby the degree of tension of the two discs may be adjusted in manufacture or in service when necessary by tightening the nuts 34.

Fig. 8 shows the wheel hub 3 connected by a pair of discs extending respectively from the outer end and the inner end of the hub to the outer and under surface of the rim 15 at which point they are lapped contiguously and attached to the rim by rivets 35 and also by welding; as before the discs are preferably connected circumferentially between the hub and rim by a plurality of bolts 36 whereby initial and permanent tensioning of the discs can be effected.

In the various forms of the disc wheel construction as shown and described, it will be noted that the union of the discs to the hub ends and to the rim edges is over a relatively large material area so that a reliable connection is insured. Furthermore, it is to be noted that the axle hubs are of strong construction and that these parts cooperate expeditiously and effectively with either the disc wheel unit or the wire wheel unit. By this interchangeability, without change of tread, it will be understood that many manufacturing and service advantages are attained.

Having described my invention, what I claim as new and desire to secure by Letters Patent, is:

1. In a vehicle wheel, in combination, a rim and a hub connected by a plurality of members to constitute a unit, an inner hub to receive said unit, and means for automatically tensioning said members when said unit is applied to said inner hub.

2. In a vehicle wheel, in combination, a rim and a hub connected to constitute a unit by a plurality of discs tensioned therebetween; an inner hub to telescopically receive said unit thereon, and means associated with said inner hub to increase the tensioning of said discs when said unit is applied to said inner hub.

3. In a vehicle wheel, in combination, a rim and a hub connected to constitute a unit by discs respectively joining the outer edges of said rim and hub and the inner edges thereof; an inner hub to receive said unit thereon, and means for tensioning said discs when said unit is applied to said inner hub.

4. In a vehicle wheel, in combination, a rim and a hub and a pair of disk members respectively joining the outer edges of said rim and hub and the inner edges thereof, said disk members being further connected to each other circumferentially between said rim and hub and being shaped to provide in effect tensioned members disposed in intersecting planes joining respectively the outer edge of said rim and the inner end of said hub and the inner edge of said rim and the outer end of said hub.

5. In combination, an inner hub to be secured to an axle, a removable wheel unit adapted for telescopic application on said inner hub, said unit including an outer hub and means associated with said inner hub adapted to surround and clamp the inner and outer end of the outer hub of said unit.

In testimony whereof I affix my signature in the presence of two witnesses.

CHARLES SAMUEL ASH.

Witnesses:
 ROY HERALD,
 DOROTHY JURGENSEN.